(12) United States Patent
Rabhi (10) Patent No.: US 10,487,825 B2
(45) Date of Patent: Nov. 26, 2019

(54) ARTICULATED COUPLING FOR PISTON SEALING DEVICE

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 0 days.

(21) Appl. No.: 15/902,660

(22) Filed: Feb. 22, 2018

(65) Prior Publication Data

US 2018/0245583 A1 Aug. 30, 2018

Related U.S. Application Data

(60) Provisional application No. 62/464,082, filed on Feb. 27, 2017.

(51) Int. Cl.
| | |
|---|---|
| F04B 53/14 | (2006.01) |
| F01B 3/00 | (2006.01) |
| F16J 1/09 | (2006.01) |
| F04B 39/00 | (2006.01) |
| F04B 37/12 | (2006.01) |
| F16J 1/00 | (2006.01) |
| F04B 1/12 | (2006.01) |
| F04B 1/20 | (2006.01) |
| F03C 1/28 | (2006.01) |
| F03C 1/06 | (2006.01) |

(52) U.S. Cl.
CPC .......... *F04B 53/143* (2013.01); *F01B 3/0085* (2013.01); *F03C 1/0605* (2013.01); *F03C 1/0636* (2013.01); *F03C 1/0644* (2013.01); *F04B 1/124* (2013.01); *F04B 1/2014* (2013.01); *F04B 37/12* (2013.01); *F04B 39/0005* (2013.01); *F04B 53/14* (2013.01); *F16J 1/008* (2013.01); *F16J 1/09* (2013.01)

(58) Field of Classification Search
CPC .... F03C 1/0406; F03C 1/0605; F04B 1/0408; F04B 1/124; F04B 1/126; F04B 27/0409; F04B 27/0878; F04B 27/0882; F04B 27/0886; F01B 3/0085; F01B 3/0088; F16J 1/22
USPC ................................. 91/179, 256, 258, 488
See application file for complete search history.

(56) References Cited

U.S. PATENT DOCUMENTS 2,413,347 A * 12/1946 Hamilton ................. F04B 53/14
                                                            92/256
2,638,850 A *  5/1953 Ferris ....................... F01B 3/0052
                                                            403/128

(Continued)

FOREIGN PATENT DOCUMENTS

WO       2015/011358 A1     1/2015

*Primary Examiner* — Thomas E Lazo
*Assistant Examiner* — Michael Quandt
(74) *Attorney, Agent, or Firm* — Young & Thompson (57) ABSTRACT

An articulated coupling is provided for a piston sealing device for a piston which includes a fixed skirt and a sliding skirt interconnected by a mechanical inter-skirt connection for axially compressing a continuous extensible segment under the action of a sliding skirt spring, the coupling replacing, on the one hand, the fixed skirt by a ball-joint skirt and providing, on the other hand, a troncospherical piston end which cooperates with a skirt troncospherical bearing surface provided on the ball joint skirt while an articulation unit interposed between the inter-skirt mechanical connection and the piston and/or between the connection and the sliding skirt.

14 Claims, 6 Drawing Sheets

(56) References Cited

U.S. PATENT DOCUMENTS 2,721,519 A * 10/1955 Henrichsen ........... F01B 3/0032
                                                184/109
2,752,214 A *  6/1956 Ferris .................... F01B 3/0085
                                                74/579 R
2,956,845 A * 10/1960 Wahlmark ............ F01B 3/0085
                                                277/445

* cited by examiner

ARTICULATED COUPLING FOR PISTON SEALING DEVICE

BACKGROUND OF THE INVENTION

Field of the Invention

The present invention relates to an articulated coupling device for a piston sealing device. The invention is an improvement of the sealing device for piston object of the patent WO 2015/011358 A1 published Jan. 29, 2015 belonging to the applicant, said device being particularly suitable for any piston operating under high pressure.

Description of the Related Art

The piston sealing device according to the patent WO 2015/011358 A1 is provided for a piston operating in a cylinder one end of which is closed by a fluid chamber, said piston comprising at least one piston head which comprises at least one fixed skirt, said head having, on the one hand, a piston bearing face for exerting a force on any mechanical, hydraulic or pneumatic transmission means and, on the other hand, a compression face opening into the fluid chamber and able to receive the pressure of a fluid.

Still according to patent WO 2015/011358 A1, the piston sealing device comprises a sliding skirt of cylindrical shape housed in a cylinder with a small clearance. Said skirt is also placed in the extension of the piston head on the side of the compression face and in the axis of said head.

It is noted that said sliding skirt is connected to said head by a mechanical inter-skirt connection which allows it to move in longitudinal translation with respect to said head while a pressure transmission channel arranged inside the sliding skirt crosses the latter from one end to the other in the axial direction.

The invention relating to the patent WO 2015/011358 A1 is also characterized by an extensible continuous segment of continuous annular shape which is interposed between the fixed skirt and the sliding skirt. Said segment comprises a segment inner cylindrical face subjected to the pressure of the fluid via the pressure transmission channel, a segment outer cylindrical face that can come into contact with the cylinder, a fixed skirt-side segment axial face held, directly or indirectly, in sealing contact with the fixed skirt, and a sliding skirt-side segment axial face held, directly or indirectly, in sealing contact with the sliding skirt.

Finally, the invention relating to the patent WO 2015/011358 A1 is also characterized by a sliding skirt spring which tends to bring the sliding skirt closer to the fixed skirt and to compress axially the continuous extensible segment or which, at least, acts as an abutment by keeping said sliding skirt from moving away from the fixed skirt.

On reading the patent WO 2015/011358 A1, it is understood that, in order to operate, the piston sealing device requires that the piston head, its fixed skirt and the sliding skirt always remain aligned. This configuration is ideal for hydraulic pumps and motors whose piston is oriented axially by the cylinder with which it cooperates.

In contrast, the piston sealing device according to the patent WO 2015/011358 A1 is not suitable for hydraulic pumps and motors whose pistons do not remain permanently parallel to the cylinder with which they cooperate. This is the case, for example, of bent-axis hydraulic motors with spherical pistons which nevertheless would see their volumetric and energy efficiency significantly improved by the piston sealing device according to the patent WO 2015/011358 A1.

SUMMARY OF THE INVENTION

The objective of the articulated coupling for a piston sealing device according to the invention is to solve this problem by allowing to apply the piston sealing device according to patent WO 2015/011358 A1 to any pump or hydraulic motor whose piston(s) do(es) not remain permanently parallel to the cylinder with which it(they) cooperate. Depending on its embodiment, said coupling allows:

the piston to move freely with respect to the cylinder with which it cooperates;

maintaining the energy performance and durability of the piston sealing device according to the patent WO 2015/011358 A1 despite the cyclic change in orientation of the piston with respect to the cylinder;

increasing only marginally the manufacturing cost of the pump or hydraulic motor piston which receives the piston sealing device according to the patent WO 2015/011358 A1.

It is understood that, in addition to its application to hydraulic pumps and hydraulic motors with axial or radial pistons, the articulated coupling for a piston sealing device according to the invention can be applied to any other pump, motor, motor-pump or hydraulic or pneumatic cylinder whose configuration advantageously allows exploiting said coupling.

The other features of the present invention have been described in the description and in the dependent claims, directly or indirectly dependent on the main claim.

The articulated coupling is provided for a piston sealing device which is itself provided for a piston operating in a cylinder so as to constitute a fluid chamber, said piston comprising a piston head which has a fixed skirt and which has, on the one hand, a piston bearing face for exerting a force on transmission means and, on the other hand, a compression face opening into the fluid chamber for receiving the pressure of a fluid while a sliding skirt is housed in the cylinder with a small clearance, in the extension of the piston head on the side of the compression face and in the axis of said head, said sliding skirt being connected to said head by an inter-skirt mechanical connection which allows it to move in longitudinal translation with respect to said head while a pressure transmission channel is arranged inside the sliding skirt and crosses the latter from one end to the other in the axial direction, the piston sealing device also comprising an extensible continuous segment interposed between the fixed skirt and the sliding skirt, said segment comprising a segment inner cylindrical face subjected to the pressure of the fluid via the pressure transmission channel, a segment outer cylindrical face that can come into contact with the cylinder, a fixed skirt-side segment axial face held directly or indirectly in sealing contact with the fixed skirt, and a sliding skirt-side segment axial face held directly or indirectly in sealing contact with the sliding skirt even as a sliding skirt spring tends to bring the sliding skirt closer to the fixed skirt and to compress axially the continuous extensible segment, said coupling comprising:

a skirt with a ball joint serving as a fixed skirt, axially crossed by the inter-skirt mechanical connection and interposed between the extensible continuous segment and the piston head, said skirt comprising, on the one hand, an axial face of a swiveling skirt on the piston head-side, maintained in sealing contact with the piston head and, on the other hand, an axial face of a swiveling skirt on the sliding skirt side which is held, directly or indirectly, in sealing contact with the continuous extensible segment while the sliding skirt spring maintains the stack formed by the ball joint skirt and the continuous extensible segment clamped between the sliding skirt and the piston head;

a troncospherical end of a piston arranged on the compression face, the center of the sphere whose said end constitutes a portion being positioned in the vicinity of the longitudinal axis of the piston;

a skirt troncospherical bearing surface arranged on the axial face of the swiveling skirt on the piston head-side and whose shape is complementary to that of the piston troncospherical end, the contact between said bearing surface and said end forming a ball joint connection around which the ball joint skirt can rotate to position itself with respect to the piston;

articulation means directly or indirectly interposed between the inter-skirt mechanical connection and the piston and/or between said connection and the sliding skirt.

The articulated coupling according to the present invention comprises articulation means which consist of a piston-side swiveling connection head which terminates the end of the inter-skirt mechanical connection which is closest to the piston, said head allowing said connection to pivot with respect to the piston while said head approximately retains its position with respect to the piston.

The articulated coupling according to the present invention comprises a center of rotation with respect to the piston of the piston-side swiveling connection head and a center of rotation with respect to the piston of the ball joint skirt which share the same location with respect to said piston.

The articulated coupling according to the present invention comprises a piston-side swiveling connection head which is articulated in a swivel washer of complementary shape to that of said head, said washer being housed in the piston.

The articulated coupling according to the present invention comprises articulation means which consist of at least one sliding-skirt side sliding-swiveling connection head which terminates the end of the inter-skirt mechanical connection which is closest to the sliding skirt, said head allowing said connection to pivot with respect to said skirt while said head approximately retains its radial position with respect to said skirt, but can substantially move relative thereto in the axial direction.

The articulated coupling according to the present invention comprises a piston which is traversed from one end to the other lengthwise by an inter-skirt connection tunnel in which is housed the inter-skirt mechanical connection with sufficient clearance to allow the latter to orient itself with respect to the piston.

The articulated coupling according to the present invention comprises a piston-side swiveling connection head which comprises a fluid passage channel which allows the fluid to pass between said head and its housing or from one face to the other of said head.

The articulated coupling according to the present invention comprises a sliding skirt-side sliding-swiveling connection head which comprises a fluid passage channel which allows the fluid to pass between said head and its housing or from one face to the other of said head.

The articulated coupling according to the present invention comprises an outer cylindrical face of the ball joint skirt which has a circular decompression groove.

The articulated coupling according to the present invention comprises a sliding skirt spring which is housed in a spring cup which is integral with the sliding skirt, said spring itself bearing, on the one hand, directly or indirectly on said cup and, on the other hand, directly or indirectly on the inter-skirt mechanical connection.

The articulated coupling according to the present invention comprises a sliding skirt spring which is housed in an added-on spring cup which, directly or indirectly, bears on the sliding skirt, said spring itself bearing, on the one hand, directly or indirectly in said cup and, on the other hand, directly or indirectly on the inter-skirt mechanical connection.

The articulated coupling according to the present invention comprises a sliding skirt spring which bears in the added-on spring cup and/or on the inter-skirt mechanical connection via a spring bearing washer.

The articulated coupling according to the present invention comprises a spring bearing washer which has an axial stop abutment which determines the minimum length of the sliding skirt spring.

The articulated coupling according to the present invention comprises a piston which has, in its periphery and in the vicinity of the piston troncospherical end, a dislocation abutment which can come into contact with the cylinder if the contact between the skirt troncospherical bearing surface and the piston troncospherical end is totally or partially broken.

BRIEF DESCRIPTION OF THE DRAWINGS

The description that follows, with reference to the accompanying drawings given by way of non-limiting examples, will provide a better understanding of the invention, the characteristics it presents, and the advantages that it is likely to provide.

DESCRIPTION OF THE PREFERRED EMBODIMENTS

FIGS. 1 to 10 show the articulated coupling 1 for the piston sealing device 2 according to the invention, various details of its components, variants and accessories.

The articulated coupling 1 is provided for a piston sealing device 2, the latter being itself provided for a piston 3 operating in a cylinder 4 so as to constitute a fluid chamber 5, said piston 3 comprising a piston head 6 which comprises a fixed skirt 7 and which comprises, on the one hand, a piston bearing face 8 for exerting a force on transmission means 9 and, on the other hand, a compression face 10 opening into the fluid chamber 5 to receive the pressure of a fluid 11.

In addition, and as is clearly shown in FIGS. 1 to 5 and FIG. 8, the piston sealing device 2, for which the articulated coupling 1 is provided according to the invention, comprises a sliding skirt 12 which is housed in the cylinder 4 with a small clearance, in the extension of the piston head 6 on the side of the compression face 10 and in the axis of said head 6, said sliding skirt 12 being connected to said head 6 by an inter-skirt mechanical connection 13 which allows it to move longitudinally with respect to said head 6, while a pressure transmission channel 14 is arranged inside the sliding skirt 12 and crosses the latter from one end to the other in the axial direction.

FIGS. 1 to 10 show that the piston sealing device 2 for which the articulated coupling 1 according to the invention is provided also comprises a continuous extensible segment 15 interposed between the fixed skirt 7 and the sliding skirt 12.

Figure 7:
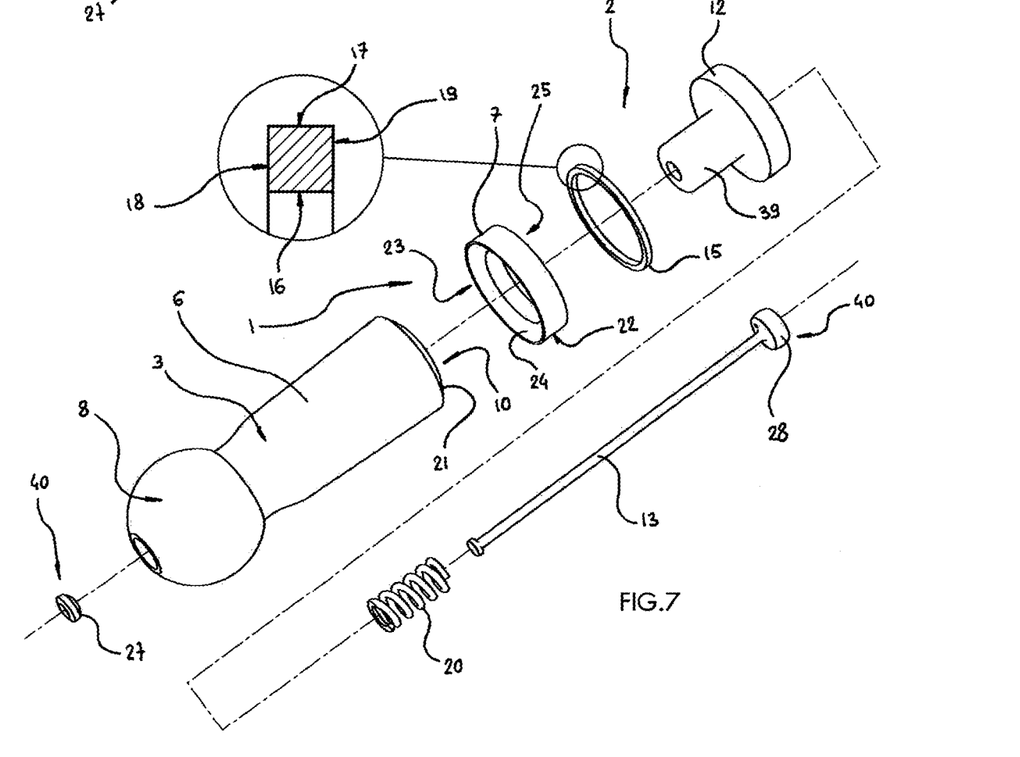
FIG. 7 is an exploded three-dimensional view of a piston which receives the articulated coupling according to the invention, said coupling itself receiving articulation means interposed between the inter-skirt mechanical connection and the piston and between said connection and the sliding skirt.
Figure 10:
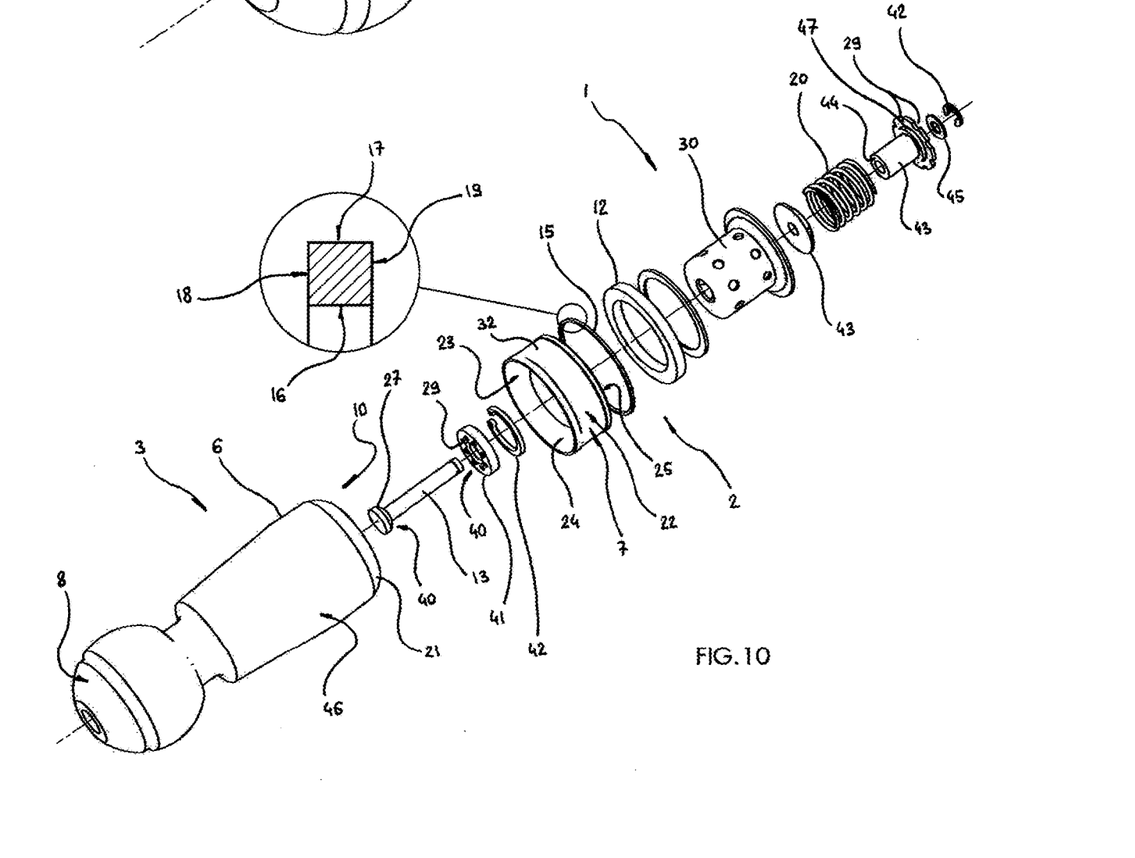
FIG. 10 is an exploded three-dimensional view of the piston shown in FIG. 8, said piston receiving the articulated coupling according to the invention.

In FIGS. 7 and 10, it is noted that said segment 15 comprises a segment inner cylindrical face 16 subjected to the pressure of fluid 11 via the pressure transmission channel 14, a segment outer cylindrical face 17 being able to come into contact with the cylinder 4, a fixed skirt-side segment axial face 18 held, directly or indirectly, in sealing contact with the fixed skirt 7, and a sliding skirt-side segment axial face 19 held, directly or indirectly, in sealing contact with the sliding skirt 12.

FIGS. 1 to 5, FIGS. 7 and 8, and FIG. 10 also show that said piston sealing device 2 also comprises a sliding skirt spring 20 which tends to bring the sliding skirt 12 closer to the fixed skirt 7 and to compress axially the continuous extensible segment 15.

It is therefore in this particular context of the piston sealing device 2 as illustrated in FIGS. 1 to 10 that the articulated coupling 1 according to the invention comprises a ball-joint skirt 22 which acts as a fixed skirt 7, which is traversed axially by the inter-skirt mechanical connection 13, and which is interposed between the continuous extensible segment 15 and the piston head 6.

Figure 8:
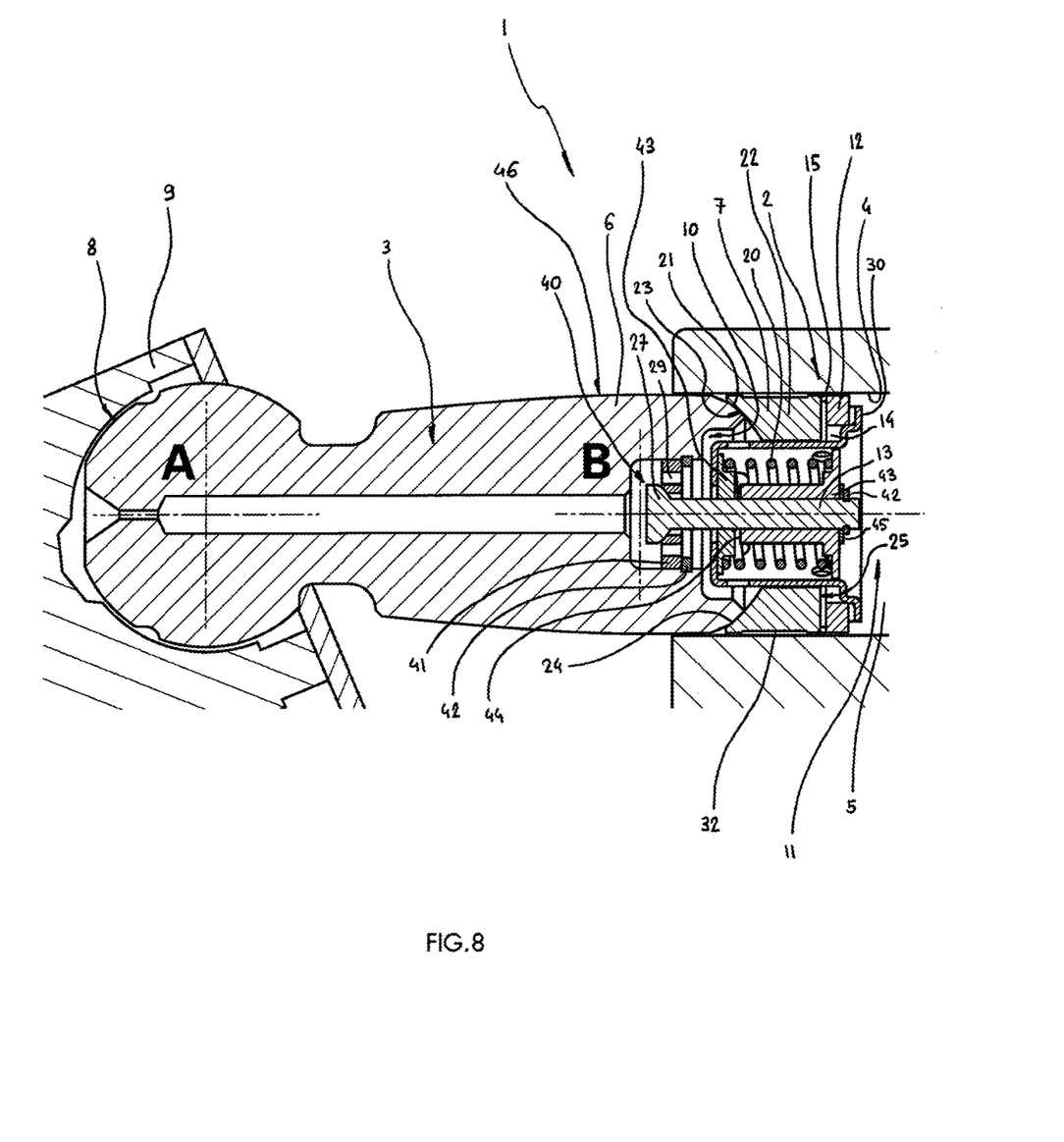
FIG. 8 is a schematic sectional view of a piston which receives the articulated coupling according to the invention, said coupling itself receiving articulation means interposed between the inter-skirt mechanical connection and the piston but not between said connection and the sliding skirt, the center of rotation with respect to the piston of the piston-side swiveling connection head and the center of rotation with respect to the piston of the ball joint skirt sharing the same location with respect to said piston, while the sliding skirt spring is housed in an added-on spring cup.

As can clearly be seen in FIGS. 2 to 5 and in FIG. 8, the articulated coupling 1 according to the invention provides that the ball joint skirt 22 comprises, on the one hand, an axial face of a piston head-side swiveling skirt 23 held in sealing contact with the piston head 6 and, on the other hand, an axial face of a sliding skirt-side swiveling skirt 25 which is held, directly or indirectly, in sealing contact with the continuous extensible segment 15 while the sliding skirt spring 20 maintains the stack formed by the ball joint skirt 22 and the continuous extensible segment 15 clamped between the sliding skirt 12 and the piston head 6.

The articulated coupling 1 according to the invention also comprises a troncospherical piston end 21 arranged on the compression face 10, the center of the sphere, of which said end 21 constitutes a portion, being positioned in the vicinity of the longitudinal axis of the piston 3.

FIGS. 2 to 5, FIG. 8 and FIG. 10 show that the articulated coupling 1 according to the invention also comprises a skirt troncospherical bearing surface 24 which is arranged on the axial face of the piston head-side swiveling skirt 23 and whose shape is complementary to that of the troncospherical piston end 21.

It is noted that the contact between said bearing surface 24 and said end 21 forms a ball joint around which the ball joint skirt 22 can rotate to orient itself with respect to the piston 3, said contact remaining sealed regardless of the orientation of the piston 3 in the cylinder 4.

In FIGS. 1 to 8 and in FIG. 10, it will be noted that the articulated coupling 1 according to the invention comprises articulation means 40 directly or indirectly interposed between the inter-skirt mechanical connection 13 and the piston 3 and/or between said connection 13 and the sliding skirt 12, said connection 13 being able to pivot about said means 40 and/or translate with respect to said means 40 to form a pivoting and/or sliding joint with one, two or three axes of freedom either with the piston 3, or with the sliding skirt 12, or with both 3, 12.

It should be emphasized here that in the context of certain applications of the articulated coupling 1 according to the invention, the sliding skirt spring 20 become unnecessary and can be eliminated.

According to an alternative embodiment of the articulated coupling 1 according to the invention shown in FIGS. 1 to 10, the articulation means 40 may consist of a swiveling connection head on the piston side 27 which terminates the end of the inter-skirt mechanical connection 13 which is closest to the piston 3, said head 27 allowing said connection 13 to pivot with respect to the piston 3 while said head 27 approximately retains its position with respect to the piston 3.

It should be noted that according to a particular embodiment of the articulated coupling 1 according to the invention shown in FIGS. 1 to 7, the piston-side swiveling connection head 27 may be positioned in the vicinity of the end of the piston 3 which comprises the piston bearing face 8.

This particular case may be the subject of another variant in which the sliding skirt spring 20 is housed inside and/or outside said end of the piston 3 which comprises the piston bearing face 8. In this case, the piston-side swiveling connection head 27 becomes sliding-swiveling while at the other end of said piston 3, the inter-skirt mechanical connection 13 is directly or indirectly articulated in the sliding skirt 12 by means of a connection head, only swiveling and non-sliding.

Figure 9:
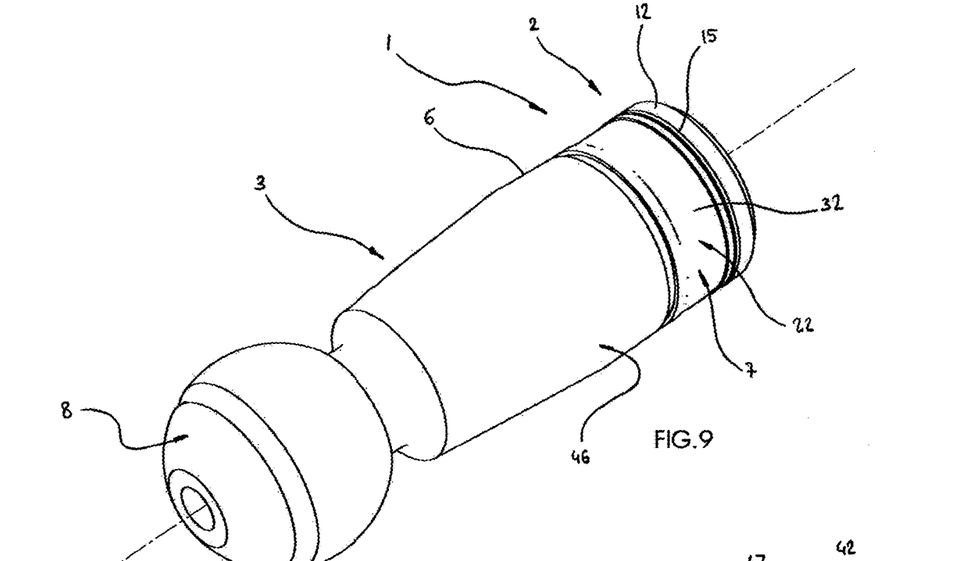
FIG. 9 is an assembled three-dimensional view of the piston shown in FIG. 8, said piston receiving the coupling according to the invention.

In a general sense, it will be noted that the piston-side swiveling connection head 27 and/or the sliding skirt-side sliding-swiveling connection head 28 can be added on at either end of the inter-skirt mechanical connection 13 by screwing, crimping, matting, welding, bracing or by any method of attachment known to those skilled in the art As shown in FIGS. 8 to 10, the center of rotation with respect to the piston 3 of the piston-side swiveling connection head 27 and the center of rotation with respect to the piston 3 of the ball joint skirt 22 may share the same location with respect to said piston 3. In this case, it is no longer necessary to interpose any articulation means 40 whatsoever between the inter-skirt mechanical connection 13 and the sliding skirt 12.

Still in relation to FIGS. 8 to 10, it will be noted that the piston-side swiveling connection head 27 can advantageously be articulated in a swivel washer 41 of a shape complementary to that of said head 27, said washer 41 being housed in the piston 3 and being, for example, held in place in said piston 3 by means of an elastic ring 42 in the form of a circlip or a snap ring.

FIGS. 1 to 7 for their part show that the articulation means 40 may consist of at least one sliding skirt-side sliding-swiveling connection head 28 which terminates the end of the inter-skirt mechanical connection 13 which is closest to the sliding skirt 12, said head 28 allowing said connection 13 to pivot with respect to said skirt 12 while said head 28 retains approximately its radial position with respect to said skirt 12, but can substantially move with respect to the latter in the axial direction.

FIGS. 1 to 7 also show that the piston 3 can be traversed from one end to the other by the inter-skirt connection tunnel 31 in which the inter-skirt mechanical connection 13 is housed with sufficient clearance to allow the latter to orient itself with respect to the piston 3.

It should be noted in passing that the piston-side swiveling connection head 27 may comprise a fluid passage channel 29 which allows the fluid 11 to pass between said head 27 and its housing, or from one face to the other of said head 27. According to a particular embodiment of the articulated coupling 1 according to the invention, particularly visible in FIG. 8 and FIG. 10, the fluid passage channel 29 may incidentally also be constituted by orifices passing through the entire thickness of a swivel washer 41.

Similarly, and as illustrated in FIGS. 2 to 5, the sliding skirt-side sliding-swiveling connection head 28 may comprise at least one fluid passage channel 29 which allows the fluid 11 to pass between said head 28 and its housing, or from one face to the other of said head 28.

Figure 2:
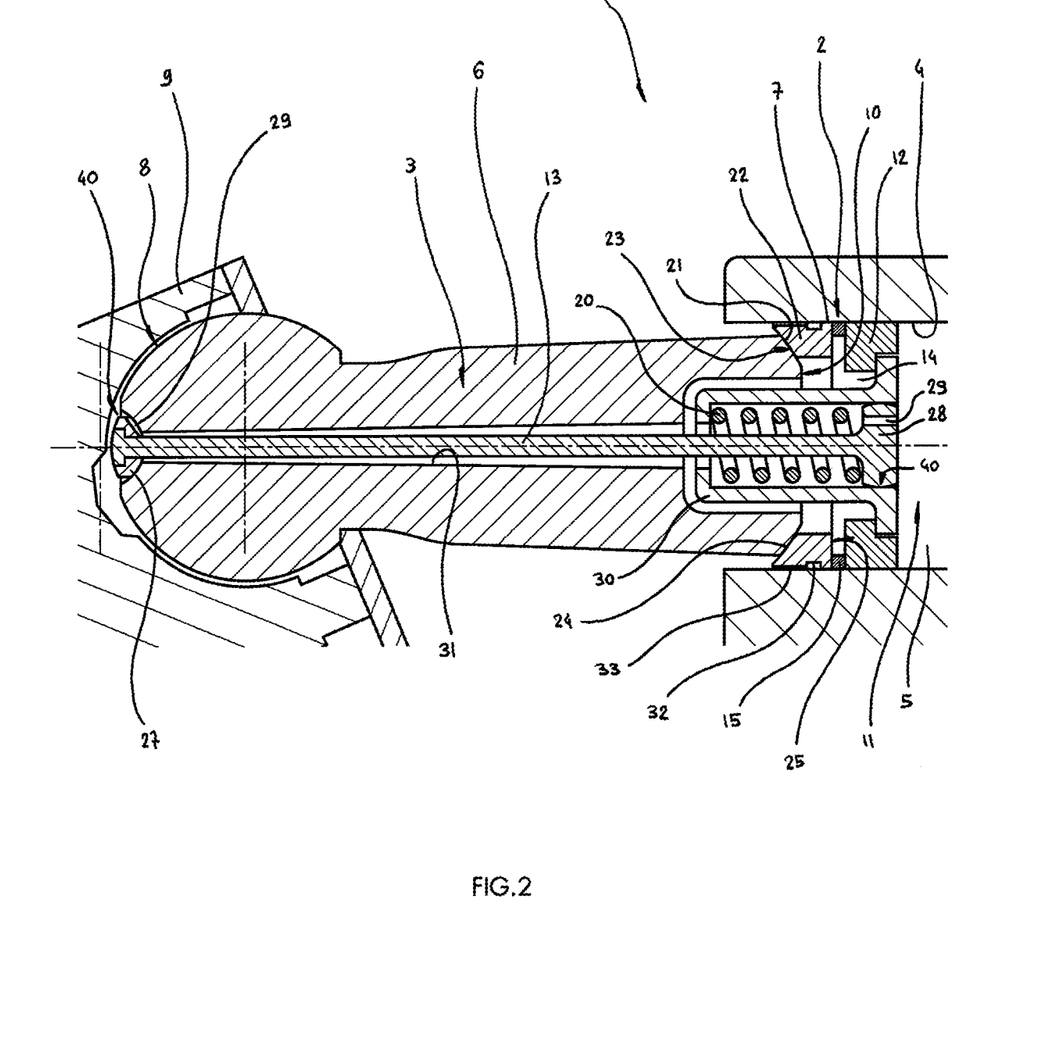
FIG. 2 is a schematic sectional view of a piston which receives the articulated coupling according to the invention, said coupling receiving articulation means interposed between the inter-skirt mechanical connection and the piston, and between said connection and the sliding skirt while the sliding skirt receives an added-on spring cup, while the ball joint skirt has a circular decompression groove and axial decompression grooves.

It can also be seen in FIG. 2 and in FIGS. 8 to 10 that, according to an alternative embodiment of the articulated coupling 1 according to the invention, the outer cylindrical face of the ball joint skirt 22 may have a circular decompression groove 32 which limits the sealing of said skirt 22 which promotes the operation of the continuous extensible segment 15, said groove 32 being able—according to a complementary embodiment of the articulated coupling 1 according to the invention—to cooperate with at least one axial decompression groove 33 which connects said circular groove 32 with the axial face of a piston head-side swiveling skirt 23.

In FIGS. 3 to 7, it will be noted that the sliding skirt spring 20 may be housed in a spring cup 39 which is integral with the sliding skirt 12, said spring 20 itself bearing, on the one hand, directly or indirectly in said cup 39 and, on the other hand, directly or indirectly on the inter-skirt mechanical connection 13.

It should be noted that, according to a particular embodiment of the articulated coupling 1 according to the invention, the body of the spring cup 39 can be pierced with one or more orifices to allow the fluid 11 to pass from the inside to the outside of said cup 39, or vice versa.

As another variant, the sliding skirt spring 20 may be housed in an added-on spring cup 30 which, directly or indirectly, bears on the sliding skirt 12, said spring 20 itself bearing, on the one hand, directly or indirectly in said cup 30 and, on the other hand, directly or indirectly on the inter-skirt mechanical connection 13. This variant is illustrated in FIG. 2 and in FIGS. 8 to 10.

It should be noted that according to a particular embodiment of the articulated coupling 1 according to the invention, the body of the added-on spring cup 30 can also be pierced with one or more orifices to allow the fluid 11 to pass from the inside to outside of said cup 30, or vice versa. This is particularly visible in FIG. 10.

Whether it is a spring cup 39 that is integral with the sliding skirt 12 or an added-on spring cup 30, it will be noted that the sliding skirt spring 20 can bear in one or the other cup 39, 30 and/or on the inter-skirt mechanical connection 13 through a spring bearing washer 43 clearly shown in FIGS. 8 and 10.

It should be noted that, in this case, the spring bearing washer 43 may include means for centering the sliding skirt spring 47. As illustrated in said FIGS. 8 and 10, the spring bearing washer 43 can bear on the inter-skirt mechanical connection 13 through an elastic ring 42 which cooperates with an axial stop washer 45.

In these same FIGS. 8 and 10, it will be noted that the spring bearing washer 43 may comprise an axial stop abutment 44 which determines the minimum length of the sliding skirt spring 20. It is moreover understood that said stop abutment 44 can operate only if the sliding skirt 12 was to move away from the ball joint skirt 22 as a result of excessive stress to which said skirt 12 and/or the continuous extensible segment 15 with which it cooperates would be subjected.

It was shown in FIGS. 8 to 10 that the piston 3 may have, in its periphery and in the vicinity of the troncospherical piston end 21, a dislocation abutment 46 which can come into contact with the cylinder 4 if the contact between the skirt troncospherical bearing surface 24 and the troncospherical piston end 21 is totally or partially broken.

It will be noted that, preferably, the dislocation abutment 46 has a softened shape, locally spherical or barrel-shaped, so that any contact occurring between said abutment 46 and the cylinder 4 does not damage the inner surface of the latter.

The modus operandi of the articulated coupling 1 for piston sealing device 2 according to the invention is easily understood from FIGS. 1 to 10.

Figure 1:
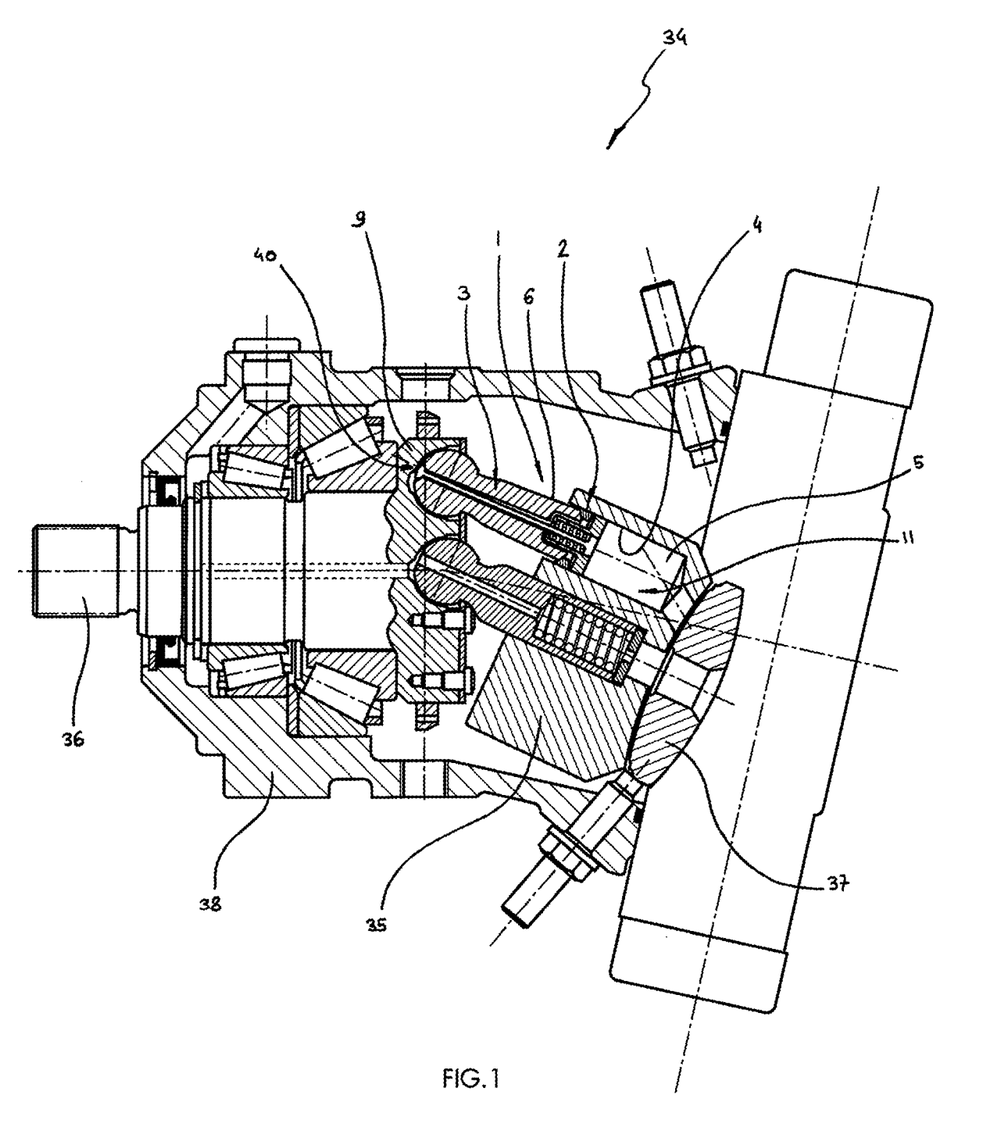
FIG. 1 is a schematic sectional view of a variable displacement axial piston hydraulic motor whose pistons receive the articulated coupling for a piston sealing device according to the invention.

FIG. 1 shows the articulated coupling 1 applied to a variable displacement axial piston hydraulic motor 34 and bent axis, that is known per se. The pistons 3 of said motor 34 are housed in a cylinder 35 integral in rotation with a transmission shaft 36. These members are housed in a motor body 38. It will be noted that, ordinarily, such a said engine 34 has pistons 3 which expose a troncospherical end, the latter forming a sliding ball joint connection with the cylinder 4 while each piston 3 is articulated around said connection. As it will be seen later, this articulation is found implemented in a related but different form by the articulated coupling 1 according to the invention.

When the pistons 3 of said motor 34 are subjected to a pressure and a hydraulic fluid flow 11 due to the particular organization of a valve plate 37 that is included in said motor 34, said pistons 3 give a driving torque to the transmission shaft 36 which can thus deliver a driving force.

By turning with the cylinder 35, each of the pistons 3 goes back and forth into the cylinder 4 with which it cooperates.

If a single piston 3 is observed, it can be seen that during a three hundred and sixty degrees revolution of the cylinder 35, said piston 3 does not remain parallel to the cylinder 4 with which it cooperates, but rotates with respect to said cylinder 4 around its two axes perpendicular to its longitudinal axis.

According to the state of the art, this relative movement is solved by the adoption of ball-end pistons, but such pistons are not suitable for receiving the piston sealing device 2, subject matter of the patent WO 2015/011358 A1.

This is why the articulated coupling 1 for a piston sealing device 2 according to the invention provides a ball joint skirt 22 which is interposed between the continuous extensible segment 15 and the piston head 6.

The function usually performed by the piston spherical head of a bent-axis hydraulic motor with spherical pistons is provided here by the ball joint constituted, when they are in sealing contact with each other, by the troncospherical piston end 21 arranged on the compression face 10, on the one hand, and by the skirt troncospherical bearing surface 24 arranged on the axial face of a piston head-side swiveling skirt 23, on the other hand.

Thus constituted, the articulated coupling 1 according to the invention allows, on the one hand, the piston sealing device 2 according to the patent WO 2015/011358 A1 to operate under the conditions provided for by said application and, on the other hand, the piston 3 to operate under the conditions of the bent-axis motors according to the prior art, the said two conditions being met by the particular operation of the ball joint skirt 22 as provided by the articulated coupling 1 according to the invention.

As illustrated in FIG. 2, most of the stress resulting from the pressure of the fluid 11 prevailing in the fluid chamber 5 is applied directly to the compression face 10 comprised by the piston head 6. Only a small fraction of said stress is applied to the ball-joint skirt 22 on its flange section radially located between, on the one hand, the contact circle between the troncospherical piston end 21 and the skirt troncospherical bearing surface 24 and, on the other hand, the inner diameter of the cylinder 4. Moreover, it is noted that said small fraction of said stress is necessary to maintain a sufficient contact pressure between the troncospherical piston end 21 and the skirt troncospherical bearing surface 24, said contact pressure being a guarantee of good sealing between these two members 21, 24.

Figure 3:
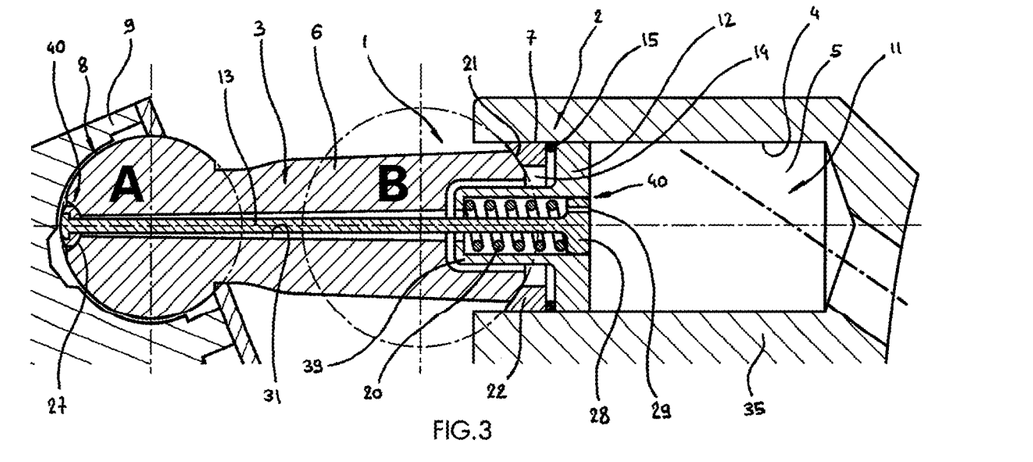
FIGS. 3 to 5 are schematic sectional views which illustrate the operation of the articulated coupling according to the invention, particularly when the piston rotates with respect to the ball joint skirt with which it cooperates.
Figure 4:
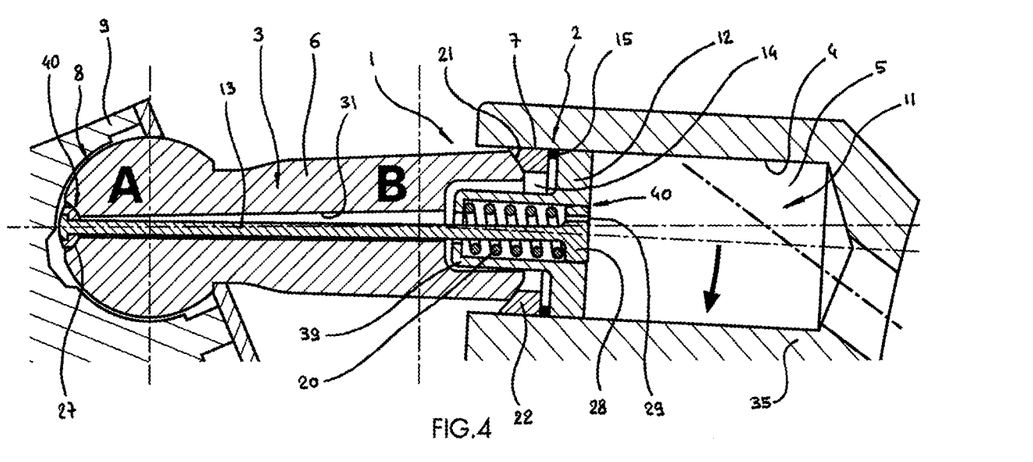
Figure 5:
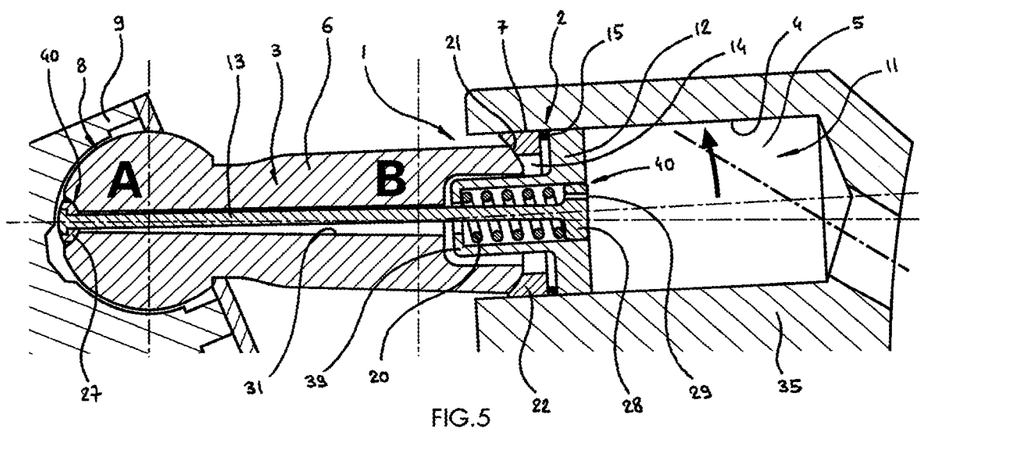
Figure 6:
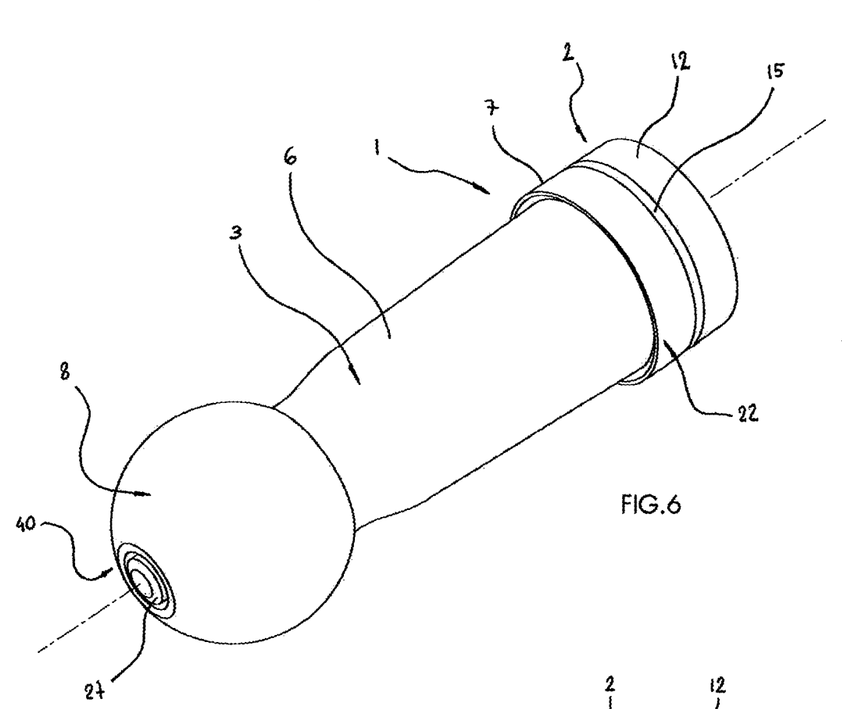
FIG. 6 is a three-dimensional view of an assembled piston which receives the articulated coupling according to the invention, said coupling receiving articulation means interposed between the inter-skirt mechanical connection and the piston and between said connection and the sliding skirt.

FIGS. 3 to 5 illustrate the tilting of the piston 3 with respect to the cylinder 4 which is allowed, on the one hand, by the ball-joint skirt 22 and, on the other hand, by the inter-skirt mechanical connection 13. It should be noted that the latter is housed with sufficient clearance in the inter-skirt connection tunnel 31 which passes through the piston 3 from one end to the other lengthwise, said clearance being necessary to allow said connection 13 to orient itself with respect to the piston 3 without touching the inner wall of said tunnel 31.

Moreover, FIGS. 3 to 5 illustrate that a relatively large clearance is also left between the orifice provided at the bottom of the spring cup 39 and the inter-skirt mechanical connection 13 so that said cup 39 and said connection 13 may never touch each other at the level of said orifice, whatever the orientation of the piston 3 with respect to the cylinder 4.

In any case, the situation is different in the particular configuration of the articulated coupling 1 as shown in FIG. 8 and according to which only a small clearance is left between the orifice provided at the bottom of the added-on spring cup 30 and the inter-skirt mechanical connection 13, the latter always assuming the same orientation as said cup 30.

It will also be noted in FIGS. 3 to 5 that since the sliding skirt spring 20 takes the form of a helical compression spring, the latter easily accommodates the cyclic variations in orientation of the inter-skirt mechanical connection 13 with respect to that of the spring cup 39 on the bottom of which said spring 20 bears.

It will also be noted in FIGS. 3 to 5 that the inter-skirt mechanical connection 13 comprises—at the piston bearing face 8—a piston-side swiveling connection head 27 which allows it to pivot with respect to the piston 3 while said head 27 retains approximately the same radial and axial position with respect to said piston 3, regardless of the orientation of said piston 3 with respect to the cylinder 4.

Furthermore, according to the particular embodiment of the articulated coupling 1 according to the invention presented in FIGS. 1 to 7, the end of the inter-skirt mechanical connection 13 which is closest to the sliding skirt 12 comprises a sliding skirt-side sliding-swiveling connection head 28 which allows said connection 13 to pivot with respect to said skirt 12 while said head 28 approximately retains its radial position with respect to said skirt 12 but may substantially move relative thereto in the axial direction.

As is particularly illustrated in FIGS. 3 to 5, the sliding skirt-side sliding-swiveling connection head 28 consists of a troncospherical nozzle which cooperates with a cylindrical housing comprised by the spring cup 39 arranged in the sliding skirt 12 and in which the sliding skirt spring 20 is housed.

Moreover, it should be noted in FIG. 2 that it is the same if said spring cup 39 gives way to an added-on spring cup 30 which bears on the sliding skirt 12.

It should be noted that in both cases, the sliding skirt spring 20 respectively bears, on the one hand, on the bottom of spring cup 39 or on that of the added-on spring cup 30 and, on the other hand, under the sliding skirt-side sliding-swiveling connection head 28.

It should be noted—particularly in FIG. 2—that the piston-side swiveling connection head 27 comprises a fluid passage channel 29 which allows the fluid 11 to pass between said head 27 and its housing. This arrangement allows in particular to lubricate the piston bearing face 8 at its contact with the transmission means 9.

Still in FIG. 2, it can be seen that the sliding skirt-side sliding-swiveling connection head 28 comprises a fluid passage channel 29 which allows the fluid 11 to pass from one face to the other of said head 28. This arrangement allows, on the one hand, to reflect the pressure that prevails in the fluid chamber 5 on the segment inner cylindrical face 16 and on the compression face 10 and, on the other hand, to let a fluid flow 11 be established in the fluid passage channel 29 comprised by the piston-side swiveling connection head 27 to lubricate the piston bearing face 8.

The positioning of the pivot axis A of the piston 3 with respect to the transmission means 9, and the positioning of the pivot axis B of the piston 3 with respect to the ball joint skirt 22 will be noted in FIGS. 3 to 5.

It will be noted that according to the particular embodiment of the articulated coupling 1 according to the invention illustrated in said FIGS. 3 to 5, the position of the pivot axis B involves a large spherical contact radius between the troncospherical piston end 21 and the skirt troncospherical bearing surface 24. Said large radius limits the corner effect suffered by ball joint skirt 22 which tends to increase its diameter. In addition, said large radius leads to a reduced axial size of the assembly consisting of the ball-joint skirt 22, the continuous extensible segment 15, and the sliding skirt 12.

However, it should be noted that the position of the pivot axis B involves a slight eccentricity of the troncospherical piston end 21 with respect to the cylinder 4 when the piston 3 pivots about its two axes perpendicular to its longitudinal axis with respect to said cylinder 4.

An alternative embodiment of the articulated coupling 1 according to the invention is shown in FIGS. 8 to 10, which consists in that the pivot axis B of the piston 3 with respect to the ball joint skirt 22 coincides with the center of rotation of the ball joint skirt 22 with respect to said piston 3.

According to said alternative, it is no longer necessary to provide articulation means 40 which are directly or indirectly interposed between the inter-skirt mechanical connection 13 and the sliding skirt 12.

However, and advantageously, according to said alternative, the piston-side swiveling connection head 27 is articulated in a swiveling washer 41 of complementary shape to that of said head 27, said washer 41 being housed in the piston 3 in which it is held by an elastic ring 42.

As can easily be deduced from FIGS. 1 to 10, whatever the variant under consideration, the particular operation of the articulated coupling 1 according to the invention indeed makes the piston sealing device 2, subject matter of the patent WO 2015/011358 A1, fully compatible with the variable displacement axial piston hydraulic motor 34 with bent axis shown in FIG. 1.

This application of the invention to said hydraulic motor is incidentally disclosed here only by way of non-limiting example, the possibilities of the articulated coupling 1 for piston sealing device 2 according to the invention not being limited to the applications that have just been described. Indeed, said coupling 1 can be applied to any machine or apparatus receiving the piston sealing device 2, subject matter of patent WO 2015/011358 A1, inasmuch as said machine or said apparatus comprises at least one piston 3 which receives said device 2 and which does not remain, during its operation, parallel to the cylinder with which it cooperates.

For example, the articulated coupling 1 according to the invention can be applied to the actuator cylinder piston and/or the return cylinder piston of the hydraulic inertia valve actuator, subject matter of the patent application FR 1659071 of 27 Sep. 2016 belonging to the applicant, insofar as said pistons are indeed equipped with the piston sealing device 2, subject matter of the patent WO 2015/011358 A1.

It must also be understood that all of the foregoing description was given only by way of example and that this does not in any way limit the scope of said invention, which would still encompass any other equivalent to the details described herein.

The invention claimed is:

1. An articulated coupling (1) for a piston sealing device (2) for a piston (3) that operatively delimits a fluid chamber (5) inside a cylinder (4), comprising:
   a piston head (6) with a piston bearing face (8) at a first side for exerting a force on transmission means (9), and a compression face (10) at a second side, opposite the first side, that opens into the fluid chamber (5) for receiving a pressure of a fluid (11);
   a fixed skirt (7) positioned at the compression face (10);
   a sliding skirt (12) configured to be fitted in the cylinder (4) at an extension of the piston head (6) at the second side of the piston head at the compression face (10) and surrounding a longitudinal axis of the piston head (6), said sliding skirt (12) being connected to the piston head (6) by an inter-skirt mechanical connection (13) configured to permit movement of the sliding skirt (12) in longitudinal translation with respect to the piston head (6), a pressure transmission channel (14) formed inside the sliding skirt (12) and traversing entirely through the sliding skirt (12) in an axial direction of the longitudinal axis;
   a continuous extensible segment (15) interposed between the fixed skirt (7) and the sliding skirt (12), said continuous extensible segment (15) having a segment inner cylindrical face (16) arranged to be subjected to the pressure of the fluid (11) through the pressure transmission channel (14), a segment outer cylindrical face (17) arranged to come into contact with the cylinder (4), a fixed skirt-side segment axial face (18) arranged to be held in sealing contact with the fixed skirt (7), and a sliding skirt-side segment axial face (19) arranged to be held in sealing contact with the sliding skirt (12); and
   a sliding skirt spring (20) arranged to urge the sliding skirt (12) closer to the fixed skirt (7) and to axially compress the continuous extensible segment (15),
   wherein the fixed skirt (7) is formed as a ball-joint skirt (22), traversed axially by the inter-skirt mechanical connection (13) and interposed between the continuous extensible segment (15) and the piston head (6), said ball-joint skirt (22) including, at a piston head-side of the ball-joint skirt (22), a swiveling skirt (23) arranged to be in sealing contact with the piston head (6), and at a sliding skirt-side of the ball-joint skirt (22), a swiveling skirt (25) arranged to be in sealing contact with the continuous extensible segment (15), the sliding skirt spring (20) arranged to hold a stack formed of the ball-joint skirt (22) and the continuous extensible segment (15) clamped between the sliding skirt (12) and the piston head (6),
   wherein the compression face (10) of the piston head (6) is provided with a troncospherical piston end (21), a center of the troncospherical piston end (21) constituting a portion positioned in vicinity of the longitudinal axis of the piston (3),
   wherein the swiveling skirt (23) has a troncospherical skirt bearing surface (24) with a shape that is complementary to a shape of the troncospherical piston end (21), a contact between said troncospherical skirt bearing surface (24) and said troncospherical piston end (21) forming a ball joint around which the ball-joint skirt (22) is rotatable so as to self-orient with respect to the piston (3), and
   wherein articulation means (40) is interposed between the inter-skirt mechanical connection (13) and the piston (3) and/or between said connection (13) and the sliding skirt (12).

2. The articulated coupling according to claim 1, wherein the articulation means (40) comprises a piston-side swiveling connection head (27) which terminates an end of the inter-skirt mechanical connection (13) closest to the piston (3), said piston-side swiveling connection head (27) configured so that said inter-skirt mechanical connection (13) pivots with respect to the piston (3) and said piston-side swiveling connection head (27) retains a position with respect to the piston (3).

3. The articulated coupling according to claim 2, wherein a center of rotation with respect to the piston (3) of the piston-side swiveling connection head (27) and a center of rotation with respect to the piston (3) of the ball-joint skirt (22) share a same location with respect to said piston (3).

4. The articulated coupling according to claim 2, wherein the piston-side swiveling connection head (27) is articulated in a swiveling washer (41) of complementary shape to that of said piston-side swiveling connection head (27), said swiveling washer (41) being housed in the piston (3).

5. The articulated coupling according to claim 2, wherein the piston-side swiveling connection head (27) comprises a fluid passage channel (29) that permits the fluid (11) to traverse said piston-side swiveling connection head (27).

6. The articulated coupling according to claim 1, wherein the articulation means (40) comprises a sliding skirt-side sliding-swiveling connection head (28) which terminates an end of the inter-skirt mechanical connection (13) closest to the sliding skirt (12), said sliding skirt-side sliding-swiveling connection head (28) configured to permit said inter-skirt mechanical connection (13) to pivot with respect to said sliding skirt (12) and said sliding skirt-side sliding-swiveling connection head (28) retains a radial position with respect to said sliding skirt (12), but is movable with respect to the sliding skirt (12) in the axial direction.

7. The articulated coupling according to claim 6, wherein the sliding skirt-side sliding-swiveling connection head (28) comprises a fluid passage channel (29) that permits the fluid (11) to traverse said sliding skirt-side sliding-swiveling connection head (28).

8. The articulated coupling according to claim 1, wherein the piston head (6) is traversed from the first side to the second side by an inter-skirt connection tunnel (31), the inter-skirt mechanical connection (13) being housed therein with a clearance sufficient to allow the inter skirt mechanical connection (13) to self-orient with respect to the piston (3).

9. The articulated coupling according to claim 1, wherein an outer cylindrical face of the ball-joint skirt (22) comprises a circular decompression groove (32).

10. The articulated coupling according to claim 1, wherein the sliding skirt spring (20) is housed in a spring cup (39) which is integral with the sliding skirt (12), said spring (20) bearing upon said spring cup (39) and upon the inter-skirt mechanical connection (13).

11. The articulated coupling according to claim 1, wherein the sliding skirt spring (20) is housed in an added-on spring cup (30) which bears upon the sliding skirt (12), said spring (20) bearing upon said added-on spring cup (30) and upon the inter-skirt mechanical connection (13).

12. The articulated coupling according to claim 11, wherein the sliding skirt spring (20) bears upon the added-on spring cup (30) and/or on the inter-skirt mechanical connection (13) via a spring bearing washer (43).

13. The articulated coupling according to claim 12, wherein the spring bearing washer (43) comprises an axial stop abutment (44) which determines a minimum length of the sliding skirt spring (20).

14. The articulated coupling according to claim 1, wherein the piston (3) comprises, at a periphery thereof and in vicinity of the troncospherical piston end (21), a dislocation abutment (46) which comes into contact with the cylinder (4) when the contact between the skirt troncospherical bearing surface (24) and the troncospherical piston end (21) is broken.

* * * * *